Patented Aug. 30, 1949

2,480,694

UNITED STATES PATENT OFFICE 2,480,694

PREVENTING SYLVITE CRYSTALS FROM CAKING

George E. Atwood, Carlsbad, N. Mex., assignor to International Minerals & Chemical Corporation, Chicago, Ill., a corporation of New York No Drawing. Application September 12, 1946, Serial No. 696,625

3 Claims. (Cl. 117—100)

In the beneficiating or concentrating of soluble salts, the final product usually and perhaps necessarily is in the form of crystalline particles of relatively small size. For example, in the case of sylvite (potassium chloride), the particle size of the final concentrate is such that most of the material will pass through a twenty-five mesh screen.

Because of the hygroscopic character of a material such as sylvite, a great amount of difficulty has been encountered by reason of the absorption of moisture from the atmosphere, which has resulted in the caking together of the individual crystalline particles. Under some atmospheric conditions, and particularly where the material has been in storage or in transportation for relatively long periods, the caking is so pronounced that it has been necessary to employ explosives for the purpose of enabling the material to be unloaded or otherwise handled, in addition to which a regrinding operation has often been necessary in order to enable the material to be compounded with other desired substances for making a usable mixture of the needed composition and analysis.

I have discovered a method of treatment by which the final product as prepared for storage or shipment can be made sufficiently resistant to ordinary climatic conditions so that it can be kept for a period of several months without any special precautions, and in an atmosphere of relatively high humidity, without losing its free-flowing characteristics and without danger of caking.

I am aware that proposals have been made to prevent caking of hygroscopic crystals or crystalline particles by treating the material with another substance in finely divided or dispersed condition. However, this method of treatment is not commercially feasible for materials such as sylvite. One reason is that the amount of material which must be added for the purpose is quite large, which not only serves to impair the purity of the material, but also adds considerably to the expense because of the large amounts necessary in order to produce any effective result.

So far as I am advised, attempts to prevent caking of the materials of the class described have generally involved the use of water insoluble substances, and the treatment has involved depositing this water-resistant material on the surfaces of the crystals in such manner that the crystals have been mechanically separated by the water insoluble substances, which explains why, when using certain types of substances for the purpose, large quantities of the added substance must be used.

I have discovered that sylvite crystals in comminuted form can be prevented from caking together by treating the crystals with an extremely attenuated solution or dispersion of substances which, when introduced into a suspension of the potassium chloride crystals in an aqueous medium or brine saturated to sylvite (potassium chloride), will be adsorbed upon the surface of the individual crystals in an extremely thin film having a thickness of the order of a few molecules and which film, after the crystals have been mechanically separated from the brine, and subsequently dried at a fairly high temperature, will be found to remain upon the surfaces of the crystals, forming a water-repellant sheath preventing moisture from the atmosphere from being absorbed by the crystals and thereby preventing the crystals from caking together.

Substances suitable for the purpose indicated are in general those materials which can be used as collector agents for the flotation of sylvite crystals when they are suspended in a saturated solution of sylvinite ore, i. e. a saturated solution of chlorides of potassium and sodium. However, the presence of sodium chloride in the brine solution does not appear to be essential in the treatment.

Example No. 1

One ton (2000 lbs.) of concentrated sylvite ore ground to pass through a 25 mesh screen and containing 95% or more of KCl or 60% or more of $K_2O$ equivalent is suspended in a brine saturated to sylvite. The slurry may be of any convenient pulp density. To the brine there is added, or there has been added, a sufficient amount of a primary aliphatic amine containing in the chain from 12 to 20 carbon atoms, or a water soluble salt of the same, for example chloride or acetate. For instance, an excellent substance for this purpose is a primary aliphatic amine acetate containing about 16 to 18 carbon atoms in the chain. Octadecyl amine acetate ($C_{18}H_{40}NO_2C_2H_3$) may be used very effectively by itself, or preferably it may be combined with octadecenyl amine acetate ($C_{18}H_{38}NO_2C_2H_3$) or with hexadecyl amine acetate ($C_{16}H_{36}NO_2C_2H_3$) in suitable proportions depending upon the temperature and other conditions of treatment. As stated, a collector of this type which has been selected to give good results in floating the sylvite will also be effective in the non-caking treatment.

In treating the sylvite concentrate to make it non-caking, it is merely necessary to provide or maintain in the solution an amount of the reagent which represents a concentration of about .15 lb. for each ton of sylvite treated, and, on this basis, the expense of the reagent will not exceed in the neighborhood of 5¢ per ton of concentrate.

After the concentrate has been agitated in the treatment solution for a few minutes, the treated slurry if of low solids content is settled in a thickener and the thickened slurry is conducted to a filter, for example of the Oliver type, or it can be centrifuged, after which the material is dried. The brine from the thickener and filter or centrifuge is saved and is re-cycled and re-fortified with collector agent for treatment of a subsequent batch of concentrate.

The damp concentrate, after leaving the filter or centrifuge, is dried in a rotary kiln dryer, which, in the example referred to, is so arranged that the flame is introduced at the upper end of the kiln and hence the concentrate and the hot gases travel in the same direction towards the discharge end of the kiln.

Other compounds in the nature of collector agents which were successfully used for imparting free-flowing characteristics to the sylvite concentrate were sodium lauryl sulphate

($C_{12}H_{25}SO_4Na$)

and mono-stearoyl ethylene diamine acetate

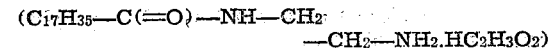
($C_{17}H_{35}-C(=O)-NH-CH_2-$
$-CH_2-NH_2.HC_2H_3O_2$)

These materials, although effective, did not appear to be quite so efficient as the primary amine acetates above referred to, because slightly more of the collector agent was necessary in order to obtain equivalent free-flowing characteristics.

I claim:

1. The improvement in the art of producing a non-caking material composed principally of sylvite particles which comprises, contacting sylvite particles with a brine saturated to sylvite and containing at least one member selected from the group consisting of long chain aliphatic amines and their water soluble acid addition salts wherein the hydrocarbon group of the aliphatic amine contains between about 12 to about 20 carbon atoms; separating the sylvite particles from the brine and drying the separated particles.

2. The improvement in the art of producing a non-caking material composed principally of sylvite particles which comprises, contacting sylvite particles with a brine saturated to sylvite and containing at least one member selected from the group consisting of long chain aliphatic amines and their water soluble acid addition salts wherein the hydrocarbon group of the aliphatic amine contains between about 12 to about 20 carbon atoms; separating the sylvite particles from the brine, and recycling and refortifying the brine with said aliphatic amine to treat a subsequent batch.

3. The improvement in the art of producing a non-caking material composed principally of sylvite particles which comprises, contacting sylvite particles with a brine saturated to sylvite and containing at least one aliphatic primary amine acid addition salt wherein the hydrocarbon group of the aliphatic amine contains 18 carbon atoms, separating the sylvite particles from the brine, and drying the separated particles.

GEORGE E. ATWOOD.

REFERENCES CITED

The following references are of record in the file of this patent:

UNITED STATES PATENTS

| Number | Name | Date |
| --- | --- | --- |
| 2,044,942 | Heckert | June 23, 1936 |
| 2,211,397 | Weinig | Aug. 13, 1940 |
| 2,222,830 | Moss | Nov. 26, 1940 |
| 2,234,484 | Weinig | Mar. 11, 1941 |
| 2,385,615 | Dreyer | Sept. 25, 1945 |